United States Patent
Pines et al.

(10) Patent No.: US 10,875,334 B2
(45) Date of Patent: Dec. 29, 2020

(54) CONDENSING VAPORED FLUID

(71) Applicant: HP Indigo B.V., Amstelveen (NL)

(72) Inventors: Assaf Pines, Ness Ziona (IL); Peter Nedelin, Ness Ziona (IL); Mark Sandler, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/349,055

(22) PCT Filed: Feb. 16, 2017

(86) PCT No.: PCT/EP2017/000224
§ 371 (c)(1),
(2) Date: May 10, 2019

(87) PCT Pub. No.: WO2018/149466
PCT Pub. Date: Aug. 23, 2018

(65) Prior Publication Data
US 2020/0189300 A1  Jun. 18, 2020

(51) Int. Cl.
*B41J 29/377* (2006.01)
*B01D 5/00* (2006.01)

(52) U.S. Cl.
CPC .......... *B41J 29/377* (2013.01); *B01D 5/0006* (2013.01); *B01D 5/009* (2013.01); *B01D 5/0069* (2013.01); *B01D 5/0072* (2013.01)

(58) Field of Classification Search
CPC . B41J 2/00; B01D 3/1487; B01D 5/00; B01D 5/0003; B01D 5/006; B01D 5/009; B01D 5/0072; B01D 5/0081; B01D 53/14; F28B 1/00; F28B 9/08; H01M 8/04156; H01M 8/04164

See application file for complete search history.

(56) References Cited

U.S. PATENT DOCUMENTS

| 2,989,443 | A |   | 6/1961  | Martin |
| 4,075,069 | A |   | 2/1978  | Shinohara et al. |
| 4,478,600 | A | * | 10/1984 | Schoener ............. B01D 7/02 23/313 FB |
| 5,017,351 | A |   | 5/1991  | Rafson |
| 6,454,835 | B1 |  | 9/2002  | Baumer |

(Continued)

FOREIGN PATENT DOCUMENTS

| CN | 202993793 U | 6/2013 |
| CN | 104296555 A | 1/2015 |

(Continued)

OTHER PUBLICATIONS

Gas/liquid Separation Technology, < http://www.sulzer.com/fi/-/media/Documents/ProductsAndServices/Separation_Technology/Separators/Brochures/Gas_Liquid_Separation_Technology.pdf >.

*Primary Examiner* — Anh T Vo
(74) *Attorney, Agent, or Firm* — Dicke Billig & Czaja PLLC

(57) ABSTRACT

In an example, a condenser apparatus to condense vapored fluid has a gas inlet, a mesh, a cooling element, and a gas outlet. The mesh is configured to carry a layer of condensed fluid. The cooling element is configured to cool the layer of condensed fluid. The mesh is configured to let pass through vapored fluid and to create bubbles including vapored fluid in the layer of condensed fluid.

20 Claims, 2 Drawing Sheets

(56) References Cited

U.S. PATENT DOCUMENTS

| | | | | |
|---|---|---|---|---|
| 7,762,090 B2* | 7/2010 | Lee | ..................... | B01D 5/0015 |
| | | | | 165/113 |
| 2014/0130687 A1* | 5/2014 | Shibusawa | .............. | C23C 16/26 |
| | | | | 101/127 |
| 2015/0258805 A1* | 9/2015 | Stamp | ..................... | B41J 2/175 |
| | | | | 347/90 |

FOREIGN PATENT DOCUMENTS

| EP | 1616610 | 1/2006 |
|---|---|---|
| WO | WO-2004067138 | 8/2004 |

\* cited by examiner

CONDENSING VAPORED FLUID

BACKGROUND

A fluid can be in a gaseous state or in a liquid state. For example, liquid fluid may volatize in that it evaporates. This means in some situations that the fluid disappears and/or gets lost in that the liquid fluid transforms into vapored fluid, which may easily escape. However, vapored fluid can be transformed back into liquid fluid by condensing, i.e. transforming the fluid from gaseous phase into liquid phase.

BRIEF DESCRIPTION OF THE DRAWINGS

Examples will be described, by way of example only, with reference to the accompanying drawings in which corresponding reference numerals indicate corresponding parts and in which.

Figure 1:
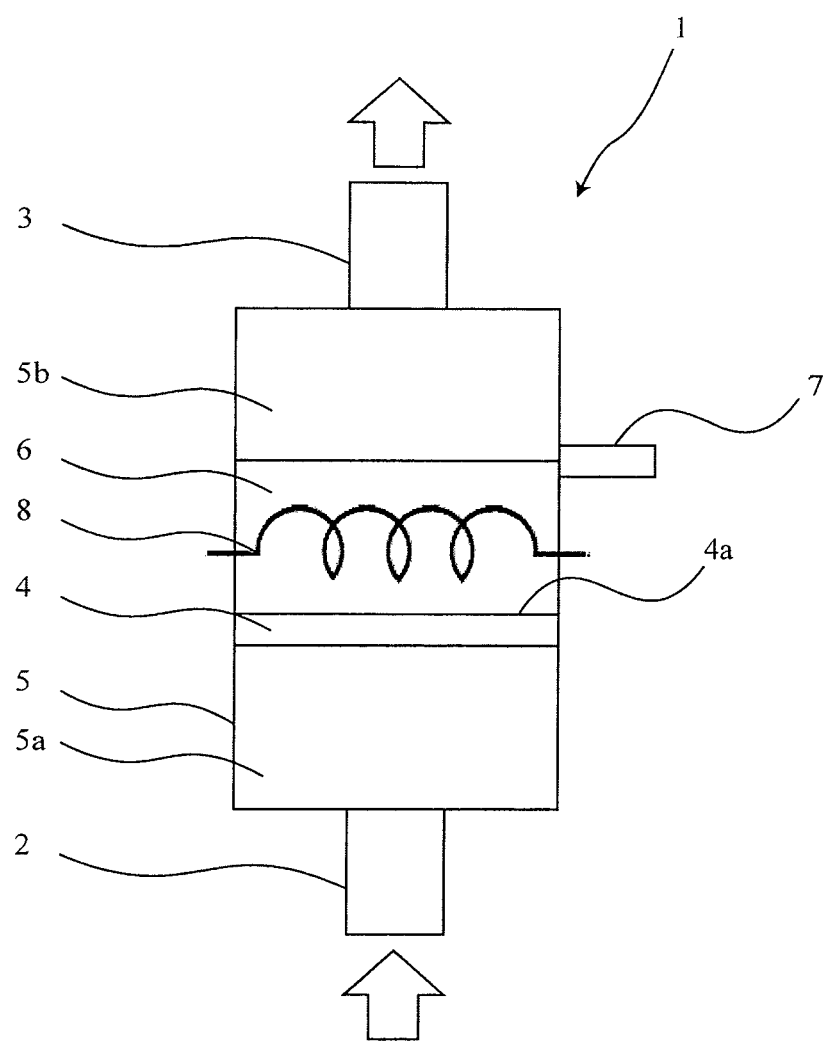
FIG. 1 is a schematic illustration of an example condenser apparatus.

Moreover the drawings provide examples and/or implementations consistent with the description; however, the description is not limited to the examples and/or implementations provided in the drawings.

DETAILED DESCRIPTION

The description refers to a condenser apparatus, a printing system with a condenser apparatus and a method for condensing vapored fluid by the condenser apparatus.

The terms "vapored fluid" and "condensed fluid" denote fluid in gaseous phase and fluid in liquid phase respectively. The description is formulated with regard to vapored fluid. However, if not otherwise mentioned, the description also pertains to a gaseous mixture including the vapored fluid, e.g. a mixture including the vapored fluid in addition to one or more further gaseous substances, for example, a mixture of the vapored fluid and air, in particular air contaminated with vapored fluid.

An example condenser apparatus is configured to condense vapored fluid, i.e. fluid in gaseous phase. The condenser apparatus has a gas inlet, a mesh, a cooling element, and a gas outlet. The mesh is configured to carry a layer of condensed fluid, i.e. the mesh is configured to support the layer of condensed fluid deposited on a surface of the mesh. The cooling element is configured to cool the layer of condensed fluid. The mesh is configured to let pass through vapored fluid. The mesh is further configured to create bubbles including vapored fluid in the layer of condensed fluid.

An example printing system has a printer and a condenser apparatus. The printer is configured to print using a printing fluid. In this example, the vapored fluid comprises vapored printing fluid. The condenser apparatus is configured to condense vapored printing fluid. The condenser apparatus has a gas inlet, a mesh, a cooling element, and a gas outlet. The mesh is configured to carry a layer of condensed printing fluid. The cooling element is configured to cool the layer of condensed printing fluid. The mesh is configured to let pass through vapored printing fluid. The mesh is configured to create bubbles including vapored printing fluid in the layer of condensed printing fluid. As regards the example printing system, the description is formulated with regard to vapored fluid. However, if not otherwise explicitly mentioned, the description also pertains to vapored printing fluid. In some examples, the printer is a 3D printer, e.g. configured to print three-dimensional objects on a printing bed. In some examples, the printer is a 2D printer, e.g. for printing liquid ink on a printing media, e.g. including paper sheet or plastic sheet.

An example method of condensing vapored fluid by a condenser apparatus, wherein the condenser apparatus has a gas inlet, a mesh, a cooling element, and a gas outlet, includes carrying, by the mesh, a layer of condensed fluid. The method further includes cooling, by the cooling element, the layer of condensed fluid. The method further includes passing vapored fluid through the mesh. The method further includes creating, by the mesh, bubbles including vapored fluid in the layer of condensed fluid.

The examples involve condensing vapored fluid into condensed fluid, i.e. transforming fluid from gaseous phase into liquid phase by cooling for extracting heat from the gaseous fluid such that the fluid liquefies.

In the examples, vapored fluid can be directed through the gas inlet into the condenser apparatus. In some examples, the condenser apparatus has a chamber, which is separated by the mesh into a first portion of the chamber including the gas inlet and a second portion of the chamber including the gas outlet. The cooling element is arranged in the second portion of the chamber, in some examples.

In the examples, the mesh provides a plurality of passages. The passages are configured with regard to their passage width, i.e. mesh size, to let pass through vapored, i.e. gaseous fluid, but to not let pass through condensed, i.e. liquid fluid (under the assumption that no external pressure is applied). Therefore, in some examples, vapored fluid directed through the gas inlet passes the mesh, whereas the mesh carries a layer of condensed fluid on a side of the mesh opposite to the gas inlet in that the mesh does not let pass through condensed fluid. This means the layer of condensed fluid is deposited on the mesh's surface opposite to the gas inlet. The mesh has an appropriate small mesh size which prevents from the condensed fluid permeating the mesh. In some examples, the mesh is a dividing wall between the first portion and the second portion of the chamber, which allows vapored fluid to flow from the first chamber into the second chamber but prevents condensed fluid from flowing in opposite direction, i.e. from the second chamber into the first chamber. For example, the mesh builds a bottom of the second portion of the chamber for supporting condensed fluid that collects in the second portion and the mesh prevents from the condensed fluid leaking back to the first portion of the chamber.

In passing the mesh, the vapored fluid escapes from the mesh's passages on the side opposite to the gas inlet and enters the layer of condensed fluid, which is deposited on the mesh's surface opposite to the gas inlet. In that the vapored fluid escapes from multiple passages and enters the deposited layer of condensed fluid, the mesh creates (gas) bubbles (including vapored fluid) in the layer of condensed fluid. Thereby, the mesh transforms the gaseous flow received from the gas inlet into a flow of bubbles in the layer of condensed fluid deposited on the mesh.

In the examples, the cooling element is configured and also arranged for cooling the layer of condensed fluid deposited on the mesh. By cooling the layer of condensed fluid, vapored fluid included in the bubbles condenses at the bubbles' (cold) surface, since the surface of a bubble is the (cooled) condensed fluid of the layer of condensed fluid. Thereby, the condenser apparatus transforms the vapored, i.e. gaseous fluid included in the bubbles into condensed, i.e. liquid fluid at the surface of the bubbles. Therefore, (in a regular operation mode of the condenser,) a physical process of condensation takes place at the bubble's surface within the layer of condensed fluid deposited on the mesh. Since the surface of the bubbles is built of condensed fluid, the formerly vapored fluid directly enters the (already) condensed fluid of the layer of condensed fluid. In that the process of condensation takes place at the bubbles' surfaces, and, thus, embedded in the layer of (already) condensed fluid deposited on the mesh, the examples prevented from or at least reduce formation of mist of fluid, which otherwise escapes through the gas outlet.

Since the condensation of vapored fluid inside the layer of condensed fluid transports heat into the layer of condensed fluid, in some examples, the cooling element is dimensioned to at least extract the condensation heat from the layer of condensed fluid deposited on the mesh. For example, the cooling element is further configured to also extract heat transported by the gas flow entering the condenser apparatus via the gas inlet. For example, by controlling a cooling capacity of the cooling element, in some examples a temperature of the layer of condensed fluid deposited on the mesh is controlled to stay in a temperature range appropriate for condensing vapored fluid inside the layer of condensed fluid. This temperature can be significantly below a boiling point of the fluid and above a melting point of the fluid, for example. The closer the temperature of the layer of condensed fluid is to the melting point of the fluid, the higher is the rate of vapored fluid condensing in the layer.

Thereby, for example, the condenser apparatus allows for recycling vapored fluid and/or cleaning air contaminated with vapored fluid as follows. Vapored fluid or air contaminated with vapored fluid is directed through the gas inlet into the condenser apparatus. Then, as described before, the vapored fluid transforms into liquid phase in the cooled layer of condensed fluid deposited on the mesh. Hence, formerly vapored fluid, which is transformed into the liquid phase, is thereby extracted from the gas flow. Thus, the formerly vapored fluid, which is liquefied by the condenser apparatus does not reach the gas outlet of the condenser apparatus, but rather is collected in the layer of condensed fluid and, thereby, recycled. This allows for regaining previously vaporized fluid as liquid. On the other hand, the exhaust at the gas outlet is purified from vapored fluid to that extend the vapored fluid condenses in the condenser.

As to the example printing system, in some examples, the printer is a 2D printer. In some other examples, the printer is a 3D printer, e.g. for printing 3-dimensional objects on a printing bed. For example, the printing fluid used for printing includes, (solid) ink particles, e.g. colored resin particles, e.g. black, magenta yellow and/or cyan colored resin particles. For printing, the ink particles are transported via the printing fluid and deposited, e.g. on a printing media. This wets the printing media with printing fluid. The printing media is dried to evaporate the printing fluid, wherein the ink particles remain on the printing media. Such drying will emit vapored printing fluid to the surrounding air. In some examples, which, for example, include a 3D printer, the printing fluid comprises a priming fluid.

On the one hand, vapored printing fluid is a health risk, e.g. when it is included in the environmental air of the printing system. On the other hand, the vapored printing fluid might be lost.

In some example printing systems, the condenser apparatus is used to purify air contaminated by vapored printing fluid, e.g. in order to reduce health risks in the environment of the printing system. For example, the condenser apparatus can be operated as a filter to decrease a vapored printing fluid concentration of the environmental air of the printing system. In some examples, the printing system is enclosed in a housing and the air inside the housing is circulated through the condenser apparatus. This can reduce the concentration of vapored printing fluid in the air.

In some example printing systems, air, which includes (in particular high concentrations of) vapored printing fluid, is conducted through the condenser apparatus. The condenser apparatus recycles the printing fluid in that it extracts the vapored printing fluid from the air and collects the printing fluid in liquid phase. In some examples, the printing system includes a closed cycle of printing fluid, in that the recycled (liquid) printing fluid is reconditioned, e.g. by at least adding ink particles, and re-used in the printing process.

As regards all examples, due to a (e.g. characteristic and temperature dependent) vapor pressure of the fluid, the vapored fluid included in the bubbles may not completely condensate at the bubbles' cold surfaces, but rather some remaining vapored fluid may pass the layer of condensed fluid without getting transformed into the liquid phase. This (remaining) vapored fluid exhausts through the gas outlet. Therefore, in some examples, the efficiency of the condenser apparatus is controlled by controlling the temperature (e.g. by controlling the cooling capacity of the cooling element) of the layer of condensed fluid deposited on the mesh. The lower the temperature of the layer of condensed fluid the higher the efficiency of the physical condensation process, i.e. the higher the rate of transforming vapored fluid into condensed fluid. Therefore, controlling the temperature of the layer of condensed fluid allows for controlling an amount and/or ratio of fluid, which is transformed from gaseous state into liquid state when passing the layer in form of bubbles. However, increasing this efficiency also increases the energetic effort for cooling and/or reduces the throughput of the condenser apparatus, e.g. due to increasing viscosity of the layer of condensed fluid deposited on the mesh. In some examples, operating and/or manufacturing the condenser apparatus includes diligently balancing the operational parameters of the condenser apparatus, in particular the energetic effort for cooling, the flow throughput of the condenser apparatus, and the efficiency of the condensation process.

In some examples, a (combined) condenser apparatus includes two or more condenser apparatuses as described herein, which are arranged in parallel. This allows for increasing the flow throughput, for example. In some other examples, a (combined) condenser apparatus includes two or more condenser apparatuses as described herein, which are arranged in series, i.e. the gas outlet of a preceding condenser apparatus is connected with the gas inlet if succeeding condenser apparatus of the series of condenser apparatuses. This, for examples, allows to increase the (total) efficiency of recycling vapored fluid and/or of cleaning air from vapored fluid. In still further examples, a (combined) condenser apparatus includes two and more parallelly arranged groups of two or more serially arranged condenser apparatuses. This allows for increasing flow throughput as well as efficiency of condensing vapored fluid.

In some examples, the gas inlet, the mesh, the cooling element and the gas outlet are vertically arranged in this order. For example, the chamber of the condenser apparatus is separated by the mesh in a first portion and a second portion as described before, wherein the gas outlet is arranged at the second portion. In the vertical arrangement, the first portion of the chamber is arranged below the second portion of the chamber. The gas inlet is arranged at the first portion to receive a gas flow including vapored fluid in the first portion. In view of the vertical arrangement, the gas flow/vapored fluid flows from bottom to top. The vapored fluid passes the mesh and enters the second portion of the chamber. In the second portion, vapored fluid condenses in the layer of (already) condensed fluid deposited on the mesh. The vertical arrangement allows for automatically collecting condensed fluid on top of the mesh due to gravity. This enables the condenser apparatus to automatically generate and maintain the layer of condensed fluid deposited on the mesh.

In some examples, the condenser apparatus has a spillway to spill condensed fluid. In a regular operation mode of the condenser apparatus, vapored fluid condenses in the layer of (already) condensed fluid and there is a gain of condensed fluid in the layer of condensed fluid. The spillway enables the condensed fluid created by the condenser apparatus to exit from the camber. For example, the spillway is configured to limit a thickness of the layer of condensed fluid carried by the mesh. In some examples, the spillway is arranged at a certain height above the mesh. When the layer of condensed fluid rises up to that height, the condensed fluid is automatically spilled by the spillway. This prevents the layer of condensed fluid from getting too thick.

In some examples, the spillway is (in particular vertically) arranged between the cooling element and the gas outlet. Therefore, vapored fluid has to first pass the cooling element before it (theoretically) reaches the spillway. Since vapored fluid condenses at the cold cooling element, this reduces the amount of vapored fluid exhausting through the spillway.

In some examples, the mesh, the cooling element and the spillway are vertically arranged in this order. In an initial phase of operating the condenser apparatus, the layer of condensed fluid is not (yet) present at the mesh or the layer has not (yet) grown to an intended thickness. According to this vertical order of the mesh, the cooling element and the spillway, vapored fluid first passes the mesh and then arrives at the position of the cooling element before arriving at the position of the spillway. Therefore, the vapored fluid is cooled and condensates into the liquid phase before it can reach the spillway. Also because of the vertical arrangement, the fluid condensed at the position of cooling element drops down onto the mesh. This enables the condenser apparatus to automatically generate the layer of condensed fluid deposited on the mesh.

In some examples, the cooling element is a contact cooling element, which is, e.g. configured to directly contact the layer of condensed fluid for cooling and/or to directly contact the flow of vapored fluid for condensation of the vapored fluid on a surface of the cooling element. For example, the cooling element includes a pipe and a cooling liquid flows through the pipe to transport heat away from the layer of condensed fluid.

In some examples, the cooling element is configured to immerse in the layer of condensed fluid. For example, the cooling element is arranged in such a distance to the mash that the cooling element can be covered by the layer of condensed fluid.

In some examples, the mesh is made of interwoven filaments, matted fibers, perforated plates, sintered material, and/or open porous material. In some examples, the mesh is built by 3D printing. In some examples, the mesh is made of metal, e.g. stainless steel or brass, resin, glass or ceramics.

In some examples, the mesh includes at least one of stainless steel fibers, brass fibers, glass fibers, sintered brass and sintered glass. In some examples the mesh has a mesh size, i.e. width of the passages of the mesh, of 1 µm, 5 µm, 10 µm, 50 µm, 100µ, 200µ, 300µ, 500µ or 1000µ. The size of the bubbles can be controlled by the mesh size, for example. The smaller the mesh size the smaller the bubbles the higher the condensation efficiency and the lower the throughput of the condenser apparatus. In some examples, the mesh has a diameter of, e.g. 5 cm, 10 cm, 20 cm, or 50 cm and/or a surface area of, e.g. 20 cm$^2$, 80 cm$^2$, 300 cm$^2$, or 2000 cm$^2$.

In some examples, the fluid includes water, alcohol and/or oil, e.g. mineral oil. In some examples, the fluid includes volatile organic compounds. For example, the fluid is a printing fluid of a liquid ink, wherein the printing fluid includes mineral oil with volatile organic compounds. In some examples, the layer of condensed fluid deposited on the mesh is cooled by the cooling element to temperatures of, e.g. 3° C., 5° C. 10° C. or 15° C. As described before, the lower the temperature of the layer of condensed fluid, the higher the rate of vapored fluid being condensed, but also the higher the energetic effort for cooling and/or the low the throughput of the condenser apparatus. In some examples, the temperature of the layer of condensed fluid is controlled to temperatures (around) 5° C., 10° C., 15° C., 20° C., or 25° C. above a melting point of the fluid and/or (around) 20° C., 30° C., 50° C., 100° C., or 200° C. below a boiling point of the fluid.

Now turning to FIG. 1, which schematically illustrates an example condenser apparatus 1. The condenser apparatus 1 has a gas inlet 2 and a gas outlet 3. The condenser apparatus 1 has a mesh 4, which is permeable for gas, since it has a mesh size of about several micro meters to several hundred micro meters, for example. For example, the condenser apparatus 1 has a chamber 5, e.g. in form of a vertically arranged pipe. The chamber 5 is separated by the mesh 4 into a lower, first portion 5a, which is accessible via the gas inlet 2, and an upper, second chamber 5b, which has the gas outlet 3, e.g. on its top most ending. This allows for gas flowing through condenser apparatus 1 in that the gas enters the condenser apparatus 1 via the gas inlet 2 and exits the condenser apparatus via the gas outlet 3, thereby passing the mesh 3. For example, the clear space, i.e. the diameter of the chamber 5 is larger than the clear space of the gas inlet 2 and/or the clear space of the gas outlet 3. This allows for reducing a flow velocity of the gaseous mixture inside the condenser apparatus 1.

The mesh has a huge number of passages through which the vapored fluid can pass through. Condensed fluid cannot pass the mesh, since the passages have small diameters, i.e. the mesh has a small mesh size. Therefore, the surface tension of the fluid prevents from liquefied fluid permeating the mesh. In a regular operation mode, a layer 6 of (already) condensed fluid is deposited on the upper surface 4a of the mesh 4. The mesh is configured to carry the layer 6 of condensed fluid, since the mesh size is dimensioned small enough that the condensed fluid cannot permeate the mesh. Thus, the mesh prevents the condensed fluid of the layer 6 from leaking into the lower, first chamber 5a. Moreover, the mesh 4 enables the condenser apparatus r to collect the liquefied fluid in the upper, second chamber 5b.

The condenser apparatus 1 has a cooling element 8, e.g. a cooling pipe, for cooling the layer 6 of condensed fluid. The cooling element 8 is arranged adjacent to the mesh 4, in particular in a closer distance to the mesh 4 than the spillway 7. This enables the cooling element 8 to partly or completely immerse in the layer 6 of condensed fluid. The condensed fluid of the layer 6 can thus be cooled by the cooling element 8 directly contacting the condensed fluid. This enables an efficient heat transfer from the layer 6 of condensed fluid to the cooling element 8 via direct heat conduction.

The condenser apparatus 1 further has a spillway 7 connected to the second chamber 5b. The spillway 7 works as an overflow drain and enables condensed, i.e. liquid fluid to discharge from the condenser apparatus 1. For example, the spillway 7 is connected with a fluid reservoir for collecting condensed fluid. The fluid reservoir provides the condensed fluid, e.g. for further use. For example, the condenser apparatus 1 can be used for recycling fluid in that the condenser apparatus 1 regains condensed fluid from vapored fluid.

The condenser apparatus 1 is vertically arranged and involves gravity in its functioning. Accordingly, the gas inlet 2, the first chamber 5a, the mesh 4, the second chamber 5b, the cooling element 8, the spillway 7, and the gas outlet 3 are vertically arranged in this order and the gas flow in the condenser apparatus 1 is directed from bottom to top as indicated by arrows in FIG. 1.

The spillway 7 is arranged at a certain height above the mesh 4. For example, the spillway 7 is at distance of 1 cm, 3 cm, 5 cm or 10 cm in a vertical direction to the mesh 4. A thickness of the layer 6 of condensed fluid can thus rise up to this distance between the mesh and the spillway 7, but the thickness of the layer 6 is limited by this distance, since any additional amount of condensed fluid discharges through the spillway 7 and leaves the upper chamber 5b.

In a regular operation mode, e.g. a mixture of air and vapored fluid flows through the gas inlet 2 into the condenser apparatus 1, in particular into the lower, first chamber 5a. In the condenser apparatus 1, the vapored fluid condenses and, thereby, transforms into condensed, i.e. liquid fluid. Therefore, the gas outlet 3 exhausts purified air, i.e. air which does not include any relevant concentration of vapored fluid or at least includes a significant lower concentration of vapored fluid than the mixture directed into the gas inlet 2. The condensed fluid discharges via the spillway 7.

Therefore, the condenser apparatus 1 can be used to separate vapored fluid from a gaseous mixture, e.g. a mixture of air and vapored fluid, conducted through the gas inlet 2. The condense apparatus 1 provides at the gas outlet 3 purified air and at the spillway 7 (the extracted) condensed fluid. For example, the condenser apparatus 1 can be used as a filter, since it purifies air contaminated with vapored fluid. Additionally or alternatively, the condenser apparatus can be used for recycling, i.e. regaining vapored fluid from a gaseous mixture, e.g. a mixture of air and vapored fluid.

The vapored fluid, e.g. included in a mixture of air and vapored fluid, passes through the mesh 4 and enters the layer 6 of (already) condensed fluid deposited on the upper surface 4a of the mesh 4. When vapored fluid exits a passage of the mesh, a gas bubble arises in the layer 6 of condensed fluid at the mesh's surface, since the mesh 4 is wetted by the condensed fluid. Thereby, the mesh 4 creates, by its passages, (gas) bubbles including the vapored fluid in the layer 6 of condensed fluid.

In the example condenser apparatus 1, the layer 6 of condensed fluid is cooled to a temperature of, e.g. about 10° C., whereas the vapored fluid has room temperatures or even higher temperatures when entering the gas inlet 2. Therefore, the bubbles including ("hot") vapored fluid are surrounded by ("cold") condensed fluid in the layer 6. The temperature difference between the vapored fluid and the condensed fluid enables the vapored fluid included in a bubble to condensate at the ("cold") surface of the bubble, which surface is the ("cold") condensed fluid of the layer 6. By condensation, the vapored fluid transforms from gas to liquid and directly joins the already condensed fluid of the layer 6. In that the condensation of the vapored fluid takes place embedded in the layer 6 of (already) condensed fluid, the formation of mist is avoided or at least reduced.

A cooling capacity of the cooling element 8 is dimensioned sufficiently high to keep the temperature of the layer 6 of condensed fluid at a desired temperature appropriate for performing the condensation of the vapored fluid inside the layer 6, e.g. to 10° C. Therefore, the cooling capacity of the cooling element 8 of the example condenser apparatus 1 is dimensioned for at least compensating for i) the heat originating from the environment of the condenser apparatus 1, ii) the heat originating from the temperature of the gas flow including the vapored fluid conducted into the gas inlet 2, and iii) the condensation heat originating from the physical process of vapored fluid transforming into condensed fluid.

In an initial operation mode of the condenser apparatus 1, the layer 6 of condensed fluid is not (yet) present on the surface of the mesh 4 or has not (yet) reached a thickness sufficient to contact the cooling element 8. Therefore, in this initial operation mode, creation of bubbles and/or the condensation of vapored fluid inside the layer 6 of condensed fluid do not (yet) work properly. However, in the initial operation mode, vapored fluid passes the mesh 4 and condenses at the cooling element 8. Thereby, condensed fluid is generated at the surface of the cooling element 8 and drops down from the cooling element 8 and collects on the mesh 4 and builds up the layer 6 of condensed fluid. This enables the condenser apparatus 1 to autonomously start up. However, in some examples, the initial operation mode can be speed up or skipped in that condensed fluid is deposited onto the mesh 4 from external to the condenser apparatus 1 and, thereby generating the layer 6 of condensed fluid.

The mesh 4 is made of steel fibers, brass fibers, glass fibers, sintered brass or sintered glass, for example. The mesh 4 has a mesh size of, e.g. 1 µm, 5 µm, 10 µm, 50 µm, 100µ, 200µ, 300µ, 500µ or 1000µ. The example condenser apparatus of FIG. 1 is configured for the fluid being mineral oil including volatile organic compounds.

In some other examples, the cooling element uses heat radiation mechanism for cooling. In these examples, vapored fluid does not condensate at a surface of the cooling element, but rather without directly contacting the cooling element.

Figure 2:
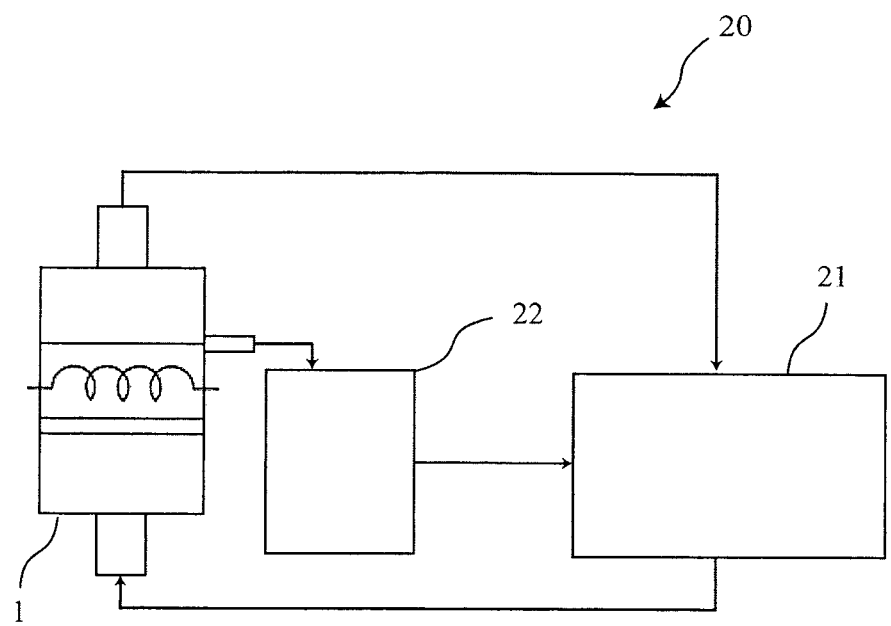
FIG. 2 is a schematic illustration of an example printing system including a printer and a condenser apparatus according to FIG. 1.

The example printing system 20 schematically illustrated in FIG. 2 includes a condenser apparatus 1 as shown by FIG. 1. Furthermore, the printing system 20 includes a printer 21, e.g. a 2D printer using liquid ink that includes resin particles and a printing fluid for carrying the resin particles, or a 3D printer using a printing fluid including a priming fluid for printing 3D objects on a printing bed. The printer 21 prints the printing fluid on a printing medium and dries the printing medium, e.g. by hot air. Drying the print medium evaporates the printing fluid and, thereby generates vapored printing fluid.

The printing system 20 has a closed cycle for circulating air through the printer 21, from the printer 21 to the condenser apparatus 1, and from the condenser apparatus back to the printer 21. By circulating air in this closed cycle, the air collects vapored printing fluid from the printer 21 and the printer is vented. The air now being contaminated with vapored printing fluid is conducted to the condenser apparatus 1, in particular to the gas inlet 2 of the condenser apparatus 1. In the condenser apparatus 1, the vapored printing fluid condenses and transforms into condensed printing fluid. Thereby, the air is purified by the condenser apparatus 1, in that the condenser apparatus 1 extracts the vapored printing fluid from the air. The purified air is conducted back, via the gas outlet 3 of the condenser apparatus 1, to the printer 21 for venting the printer 21. The condensed printing fluid extracted by the condenser apparatus 1 discharges via the spillway 7 into a printing fluid reservoir 22. From the printing fluid reservoir 22 the printing fluid can be supplied to the printer 21 for further printing. In some examples, the printing fluid is reconditioned, e.g. including adding resin ink particles, before it is supplied to the printer 21. On the on hand, this enables to recycle the printing fluid. On the other hand, this enables to purify the air contaminated with printing fluid.

In some other examples, the purified air is not conducted back to the printer 21, but rather exhausted to the environment without being a health risk, as the vapored printing fluid has been extracted by the condenser apparatus 1.

Figure 3:
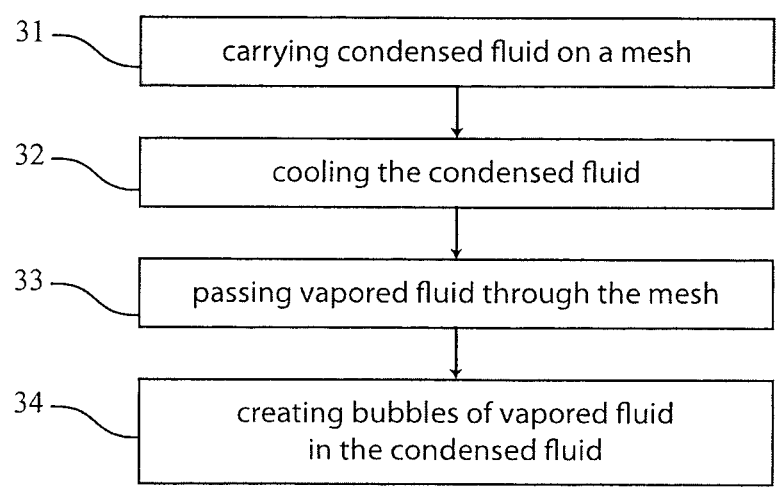
FIG. 3 shows a block diagram of an example method of condensing vapored fluid by a condenser apparatus according to FIG. 1.

FIG. 3 illustrates schematically a method of condensing vapored fluid by a condenser apparatus according to FIG. 1. For example, the example method can be carried out by the example printing system shown in FIG. 2. The example method includes carrying, in box 31, the layer 6 of condensed fluid by the mesh 4. The example method further includes cooling, in box 32, the layer 6 of condensed fluid by the cooling element 8 as described before. The example method further includes letting pass, in box 33, vapored fluid through the mesh 4 as described before. The example method further includes creating, in box 34, bubbles including vapored fluid by the mesh 4 in the layer 6 of condensed fluid as described before. Thereby, the method allows for condensing vapored fluid and, thus, generating condensed fluid from vapored fluid.

Although some examples of methods and products have been described herein, other variations are generally within the scope of this description. As will be appreciated, the description generally contemplates various implementations fairly falling within the scope of the appended claims either literally or under the doctrine of equivalents.

The invention claimed is:

1. A condenser apparatus to condense vapored fluid, the condenser apparatus comprising:
   a gas inlet to receive vapored fluid,
   a mesh vertically arranged above the gas inlet, the mesh to support a layer of condensed fluid on a side of the mesh opposite the gas inlet, prevent the condensed fluid from passing through, let the vapored fluid pass through, and create bubbles including the vapored fluid in the layer of condensed fluid,
   a cooling element vertically arranged above the mesh to cool the layer of condensed fluid, and
   a gas outlet vertically arranged above the cooling element.

2. The condenser apparatus according to claim 1, wherein the gas inlet, the mesh, the cooling element and the gas outlet are vertically arranged above each other in this order.

3. The condenser apparatus according to claim 1, wherein the condenser apparatus comprises a condensed fluid spillway to spill condensed fluid.

4. The condenser apparatus according to claim 3, wherein the condensed fluid spillway is arranged between the cooling element and the gas outlet.

5. The condenser apparatus according to claim 3, wherein the condensed fluid spillway is to limit a thickness of the layer of condensed fluid supported by the mesh.

6. The condenser apparatus according to claim 3, wherein the condensed fluid spillway is vertically arranged above the mesh.

7. The condenser apparatus according to claim 3, wherein the mesh, the cooling element, and the condensed fluid spillway are vertically arranged above each other in this order.

8. The condenser apparatus according to claim 1, wherein the cooling element is a contact cooling element, wherein the cooling element is to immerse in the layer of condensed fluid supported by the mesh.

9. The condenser apparatus according to claim 1, wherein the mesh comprises at least one of stainless steel fibers, brass fibers, glass fibers, sintered brass and sintered glass.

10. The condenser apparatus according to claim 1, wherein the mesh comprises a mesh size of at least one of 1 μm, 5 μm, 10 μm, 50 μm, 100μ, 200μ, 300μ, 500μ and 1000μ.

11. The condenser apparatus according to claim 1, wherein the fluid comprises oil.

12. A method of condensing vapored fluid by a condenser apparatus, the condenser apparatus comprising a gas inlet, a mesh vertically arranged above the gas inlet, a cooling element vertically arranged above the mesh, and a gas outlet vertically arranged above the cooling element;
    the method comprising:
    supporting, by the mesh, a layer of condensed fluid on a side of the mesh opposite the gas inlet;
    cooling, by the cooling element, the layer of condensed fluid;
    preventing the condensed fluid from passing through the mesh;
    receiving, through the gas inlet, vapored fluid;
    passing the vapored fluid through the mesh; and
    creating, by the mesh, bubbles including the vapored fluid in the layer of condensed fluid.

13. The method of condensing vapored fluid according to claim 12, the method further comprising immersing the cooling element in the layer of condensed fluid supported by the mesh.

14. The method of condensing vapored fluid according to claim 12, wherein the method further comprises limiting, by a spillway, a thickness of the layer of condensed fluid.

15. The method of condensing vapored fluid according to claim 14, wherein the spillway is arranged between the cooling element and the gas outlet.

16. The method of condensing vapored fluid according to claim 14, wherein the spillway is vertically arranged above the mesh.

17. The method of condensing vapored fluid according to claim 14, wherein the mesh, the cooling element, and the condensed fluid spillway are vertically arranged above each other in this order.

18. A printing system comprising
    a printer to print using a printing fluid; and
    a condenser apparatus to condense vapored printing fluid, the condenser apparatus comprising:
    a gas inlet to receive the vapored printing fluid,
    a mesh vertically arranged above the gas inlet, the mesh to support a layer of condensed printing fluid on a side of the mesh opposite the gas inlet, prevent the condensed printing fluid from passing through, let the vapored printing fluid pass through, and create bubbles including the vapored printing fluid in the layer of condensed printing fluid,
    a cooling element vertically arranged above the mesh to cool the layer of condensed printing fluid, and
    a gas outlet vertically arranged above the cooling element.

19. The printing system according to claim 18, the condenser apparatus further comprising:

a spillway vertically arranged above the cooling element to limit a thickness of the layer of condensed printing fluid supported by the mesh.

20. The printing system according to claim 18, wherein the spillway is arranged between the cooling element and the gas outlet.

* * * * *